(12) United States Patent
Lindskov

(10) Patent No.: US 8,654,608 B2
(45) Date of Patent: Feb. 18, 2014

(54) POSITIONING APPARATUS FOR EXCAVATING AND SIMILAR EQUIPMENT

(75) Inventor: Anders Lindskov, Ebberup (DK)

(73) Assignee: Mikrofyn A/S, Odense (DK)

( * ) Notice: Subject to any disclaimer, the term of this patent is extended or adjusted under 35 U.S.C. 154(b) by 0 days.

(21) Appl. No.: 13/641,448

(22) PCT Filed: Apr. 18, 2011

(86) PCT No.: PCT/DK2011/000033
§ 371 (c)(1),
(2), (4) Date: Oct. 18, 2012

(87) PCT Pub. No.: WO2011/131195
PCT Pub. Date: Oct. 27, 2011

(65) Prior Publication Data
US 2013/0033963 A1    Feb. 7, 2013

(30) Foreign Application Priority Data

Apr. 18, 2010 (DK) ................................ 2010 00319

(51) Int. Cl.
*G01S 15/88* (2006.01)
*E02F 3/43* (2006.01)

(52) U.S. Cl.
USPC .......................................................... 367/99

(58) Field of Classification Search
USPC .............................................. 367/99, 96, 95
See application file for complete search history.

(56) References Cited

U.S. PATENT DOCUMENTS

| | | | |
|---|---|---|---|
| 4,542,652 A | 9/1985 | Reuter et al. | |
| 6,142,059 A | 11/2000 | Chan et al. | |
| 8,255,125 B2 * | 8/2012 | Lindskov | 701/50 |
| 2009/0222177 A1 * | 9/2009 | Lindskov | 701/50 |
| 2012/0323455 A1 * | 12/2012 | Lindskov | 701/50 |
| 2013/0033963 A1 * | 2/2013 | Lindskov | 367/99 |
| 2013/0197743 A1 * | 8/2013 | Lindskov | 701/34.4 |

FOREIGN PATENT DOCUMENTS

| | | | |
|---|---|---|---|
| DE | 3907134 | 9/1990 | |
| JP | 2001064992 | 3/2001 | |
| WO | 9935462 | 7/1999 | |
| WO | 03088136 | 10/2003 | |
| WO | WO 2007054102 A1 * | 5/2007 | E02F 9/24 |
| WO | 2010003636 | 1/2010 | |
| WO | WO 2011131195 * | 10/2011 | E02F 3/43 |

* cited by examiner

*Primary Examiner* — Daniel Pihulic
(74) *Attorney, Agent, or Firm* — Maschoff Brennan

(57) ABSTRACT

In the use of a backhoe digger an indication of the precise depth of the bucket is required. This may be done by measuring the angles and extensions of the elements of the backhoe and calculating the result. This is commonly done by means of angle resolvers and linear encoders. Retro-fitting and calibration of such equipment is very difficult, and according to the invention the same data may be obtained by means of an inclinometer and length measuring devices based on pulsed ultrasound.

8 Claims, 3 Drawing Sheets

POSITIONING APPARATUS FOR EXCAVATING AND SIMILAR EQUIPMENT

FIELD OF THE INVENTION

The invention relates to a measuring apparatus for use with known excavating and earth moving equipment, said excavating and earth moving equipment comprising the components a boom, a stick, a stick extension, and a bucket, said components being moveable in relationship to each other and the ground, said measuring apparatus comprising an ultrasound transmitter and receivers, for measuring the position of the stick-bucket joint with respect to the boom-stick joint.

BACKGROUND

The tern "comprising" in the present application is intended to convey the idea of a collection of items that are relevant for the present invention, but it does not exclude that further items may be present and/or relevant. The term "comprising" is not intended to convey the idea of a completeness to the exclusion of other items, which would be better described by the expression "consisting of".

An essential component is a shovel or bucket that is fitted to a stick, the length of which may be changed, and the other end of which is linked to a boom. All movement is usually created by means of hydraulic cylinders. The bucket and its front edge is the interface to the ground that is being modified by the action of the earth moving equipment or contains the earth that is to be moved from one place to the other. The movement of the bucket has to be controlled precisely, frequently with a precision of 0.01 m. The frame of reference is frequently a global grid (GPS) or a local grid, for instance involving rotating laser planes. The depth of the bucket is frequently the most needed measurement. Known constructions have required the stick to be at minimum length in order to make use of the depth measuring system.

It is impossible to monitor the movement of the front edge of the bucket directly, and instead indirect methods are relied upon. It is possible to calculate geometrically and trigonometrically the position of the edge of the bucket when the angular relationships between all the elements are known, and the length the stick has been adjusted to. The angular relationships may be determined directly, by angle encoders on the axes of rotation, and the length of the stick may also be determined directly by linear encoders. Such elements have to be built into the equipment at the time of manufacture, because they are not suitable for retrofitting.

In case of monitoring equipment for retrofitting, angular relationships are frequently obtained indirectly by means of inclination sensors fitted to the various components.

Trigonometric relationships are used in the processing of the inclination signals obtained and the knowledge about the various distances. Some distances may be measured by means of ultrasound fields, in which an ultrasound transmitter emits a continuous wave, and phase measurements of the signal received by an ultrasound receiver provide the required data. This solution is described for general applications in WO/03088136 A2. In order to provide safety in the movement of the various components of such earth moving equipment, proximity sensors in the form of ultrasound transmitters and receivers ensure that they do not collide, as described in JP2001064992A. A measurement of the extension of a linear ladder or a support leg is described in WO2010/003636A1, in which an established reference distance is measured by the same ultrasonic elements that measure the extension of the support leg, thereby performing compensation of the influence of temperature and pressure. The use of ultrasonic elements is described as being restricted to simple elements because of spurious reflections requiring a narrow beam of ultrasonic energy.

Other methods have relied on microwaves or lasers for distance measurements. In particular laser systems are prone to malfunction due to dirt settling on optical surfaces and windows, and due to interruption of line-of-sight between transmitter and receiver. For this reason, acoustic or ultrasound waves are preferable.

SUMMARY

The solutions described above do not lend themselves to simple retrofitting and calibration, and the invention aims to provide this. This is obtained in an apparatus that is particular in that the stick is provided with an ultrasound transmitter, a first sensor in the form of an inclination sensor for providing an output signal representing the inclination of the stick with respect to a reference, that the stick extension is provided with a second sensor in the form of an ultrasound receiver providing a signal that is delayed by the instant distance from said ultrasound transmitter, and that said signals are transmitted to a signal processor provided with a memory for calibration values obtained at any time after installation of said measuring apparatus, said signal processor providing an output representative of the stick-bucket joint position.

An advantageous embodiment of the invention is particular in that the stick is furthermore provided with means for correcting for air pressure, air temperature, and air humidity in order to establish the relationship between the distance covered by an ultrasound pulse and the corresponding delay between transmission and reception of said ultrasound pulse under conditions of actual use.

A further advantageous embodiment of the invention is particular in that the signal from the ultrasound receiver representing the instant distance between the ultrasound transmitter and the ultrasound receiver is corrected by the velocity of sound determined by means of the transmission time of the roundtrip signal from the transmitter via a reflector back to the transmitter in a time window, in which it is acting as a receiver, in order to provide a corrected signal representing the position of the stick-bucket joint with respect to the boom-stick joint.

A further advantageous embodiment is particular in that data relating to a reference minimum distance is obtained by obtaining a corrected signal from the ultrasound receiver when the distance between the stick-bucket joint and the boom-stick joint is adjusted to be minimum, the actual distance between the stick-bucket joint and the boom-stick joint being measured and manually entered into the memory. At this calibration adjustment of the equipment the actual distance between the stick-bucket joint and the boom-stick joint is measured and manually entered into the memory. This feature is a requirement for this type of retrofitting.

A further advantageous embodiment is particular in that data relating to a reference maximum distance is obtained by obtaining a corrected signal from the ultrasound receiver when the distance between the stick-bucket joint and the boom-stick joint is adjusted to be maximum, the actual distance between the stick-bucket joint and the boom-stick joint being measured and manually entered into the memory. At this calibration adjustment of the equipment the actual distance between the stick-bucket joint and the boom-stick joint is measured and manually entered into the memory. This feature is a requirement for this type of retrofitting.

A further advantageous embodiment of the invention is particular in that an absolute height sensor is placed on top of the stick, an absolute height signal obtained from said absolute height sensor being used by the signal processor in the determination of the absolute height of the stick-bucket joint.

A further advantageous embodiment of the invention is particular in that that the distance between the stick-bucket joint and the tip of the bucket is regarded as a radius stored in the memory in the calculation in the signal processor for determining the absolute depth of the tip of the bucket.

A use of the measuring equipment consists in fitting components of the measuring equipment and the required power and signal wiring to components of the excavating and earth moving equipment, followed by simple calibration, and the equipment is ready to use. Re-calibration may be simply performed any time if drift in one or more parameters is suspected. If a component is damaged and replaced the same simple calibration procedure is performed.

BRIEF DESCRIPTION OF THE DRAWINGS

The invention will be described in greater detail with reference to the drawings, in which.

DETAILED DESCRIPTION

Figure 1:
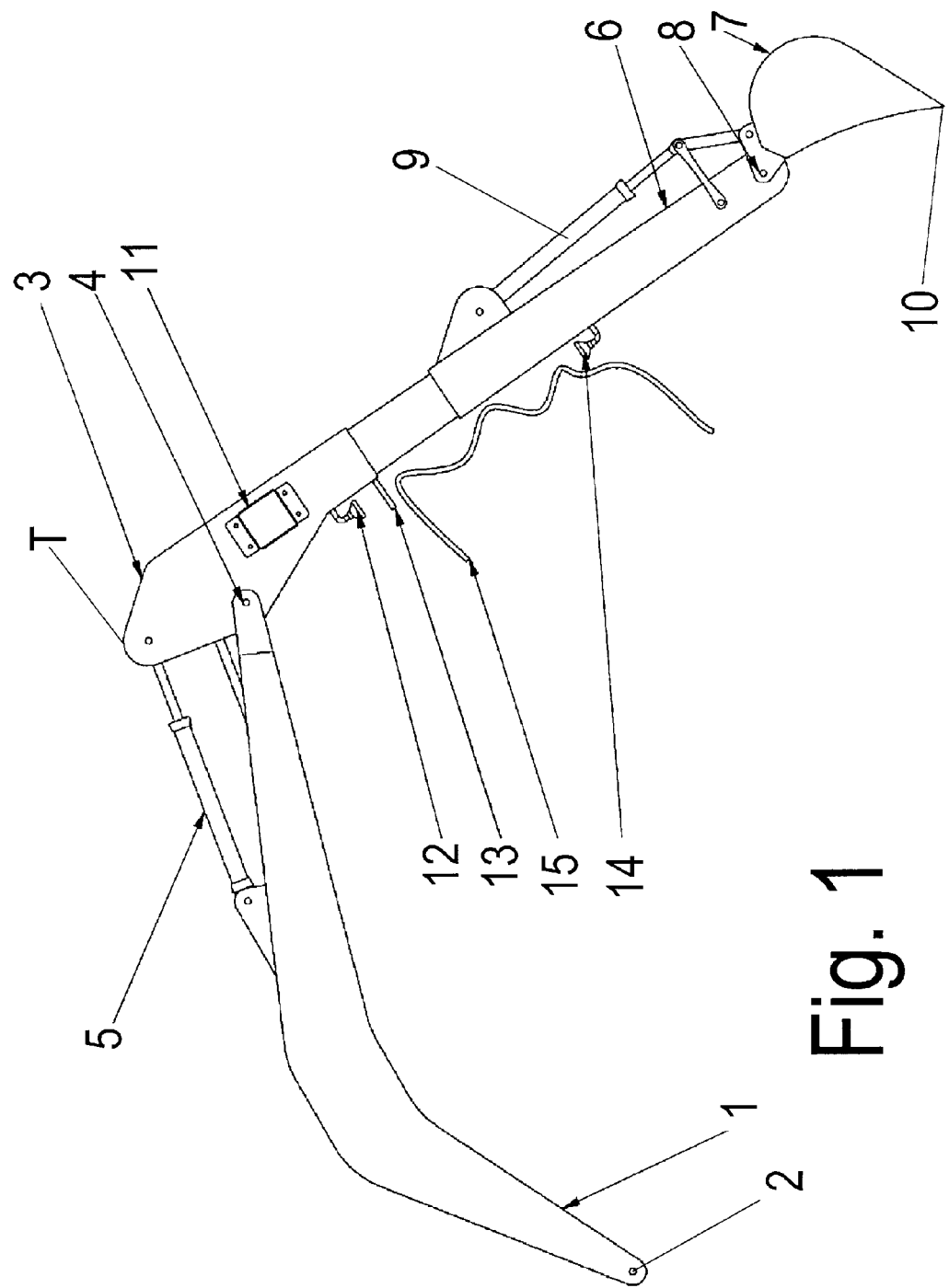
FIG. 1 shows the functional elements in earth moving equipment fitted to a backhoe tractor.

In FIG. 1 is seen a complete assembly for backhoe digging equipment. The vehicle itself is not shown. A boom 1 may be raised and lowered around a bearing or pivot 2 by means that are not shown (which indicates that it is moving in an arc of a circle in a vertical plane), and it may be moved in a horizontal plane by other means, swinging about a vertical axis. The boom 1 is connected to a stick 3 by means of a bearing or joint 4, and it may be swung in a vertical plane by means of a hydraulic cylinder 5. An absolute height detector may be placed on the highest point T of the stick. Such a detector may for instance obtain its information by detection of the vertical position of a laser plane, or it may rely on a Global Positioning System.

On the stick 3 and connected to it by a sliding bearing is fitted a stick extension 6 that may be moved back and forth by drive means that are not shown in the drawing, but which are habitually hydraulic. As shown, the stick extension is arbitrary, neither minimum, nor maximum. At the end of the stick extension 6 there is fitted a bucket 7, which may swivel on a joint or bearing 8. The bucket may be swung back and forth by means of a hydraulic cylinder 9. In one extreme position the bucket 7 may contain earth collected by shovelling, and in the other it is emptied, and its front edge (tip)10 may be used for scraping, and when the front plane surface of the bucket is horizontal it may be used for shovelling.

In order to be able to work the earth to a desired shape it is important to know the precise depth of the tip 10 at any place in contact with the earth. This information is used when creating slopes and levels. This depth must be known for any position of the elements in the assembly and also when the vehicle has moved. In order to establish this measurement a number of indirect measurements are made. The angle of the stick 3 and the degree of stick extension 6 are measured, and these measurements are sufficient to calculate the distance from the boom-stick joint 4 to the tip 10 of the shovel 7, when this is extended to its maximum. Combined with an absolute height determination the depth is directly calculable.

In order to perform the above measurements, a set of measuring elements is fitted to the earth moving equipment. This may occur at the time of construction, but equally and advantageously as a retro-fit. An inclinometer 11 is fitted to the stick 3, giving a measurement of the inclination with respect to the vertical. On the stick 3 is fitted an ultrasound transmitter 12X that has a gating function that enables it to be an ultrasound receiver 12R when it is not transmitting. At a well-defined distance from the transmitter is placed an ultrasound reflector 13 that provides information about the transit time of the emitted ultrasound pulse from transmitter 12X via reflector 13 and back to the transmitter 12R when subsequently used as a receiver. The temperature and pressure of the surrounding air are the main influences on this transit time, but the well-defined distance enables this transit time to be used as a reference, compensating for the above influences. It is obvious that instead of the reflector 13 an ultrasound receiver may be used, providing a separate electrical signal for processing. The essential thing is that the reference distance between ultrasonic components 12 and 13 is well-known in absolute terms. In an alternative solution, the signal from the ultrasound receivers representing the instant distance between the ultrasound transmitter and an ultrasound receiver is corrected by the velocity of sound determined by means of signals from temperature and pressure sensors provided to the processing unit, in which are stored tabulated data relating such measurements to the velocity of sound. Such temperature and pressure sensors may be housed in the inclinometer 11 and the data transmitted to the signal processing unit 16.

The stick extension 6 is provided with an ultrasound receiver 14, and because it is further away from the transmitter than the reflector 13 it receives its ultrasound signal later. The reception is unhampered by intervening elements, such as hydraulic hoses, schematically shown at 15, and here the advantage is demonstrated of having a transmitter with a broader distribution diagram than the thin pencil afforded by e.g. a laser source. Provided the distribution diagram is broad enough, the interference from the intervening elements 15 is negligible. The time delay is corrected by means of the reference transit time, and the distance between the transmitter 12X and the receiver 14 may hence be determined with high precision. This is, however, not of particular interest per se, but the distance between the joints 4 and 8 is, and it is this value that is attached to the time delay at the receiver 14 in a conversion table.

Figure 2:
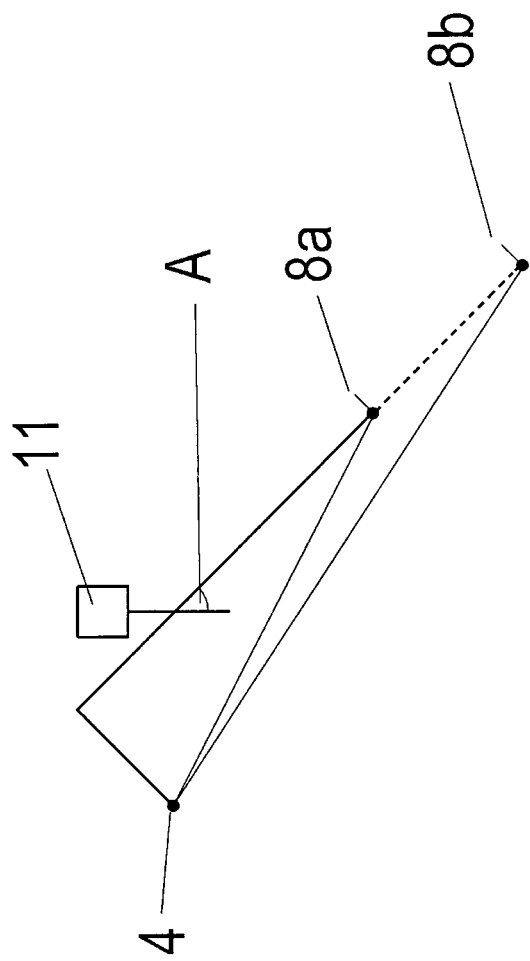
FIG. 2 shows a schematic of the geometrical relationship between the functional elements in two positions.

FIG. 2 is a schematic diagram with the various mechanical elements degenerated to rods with the pivots as their ends. The stick extension is minimal, which means that the distance between pivots 4 and 8a is minimum. The stick extension maximum is also shown, and the distance between the pivots 4 and 8b is maximum. It will be noted that the pivot 4 is not on the line defined by the stick 3 and the stick extension 6, which means that the distance between the pivots 4 and 8 is not increased by the amount indicated by the increase in the distance between the ultrasound transmitter/receiver 12 and the receiver 14 but has to be calculated by trigonometric means. The signal from the inclination sensor 11 representing the angle A is essential for a simple measurement of the depth. The distance of the pivot 4 from the centreline of the stick 3 has been exaggerated in FIG. 2.

After retro-fitting the measuring elements the measurement system is calibrated by placing the earth moving equipment elements in particular orientations and performing simple length and angle measurements and entering them into the system's memory.

Figure 3:
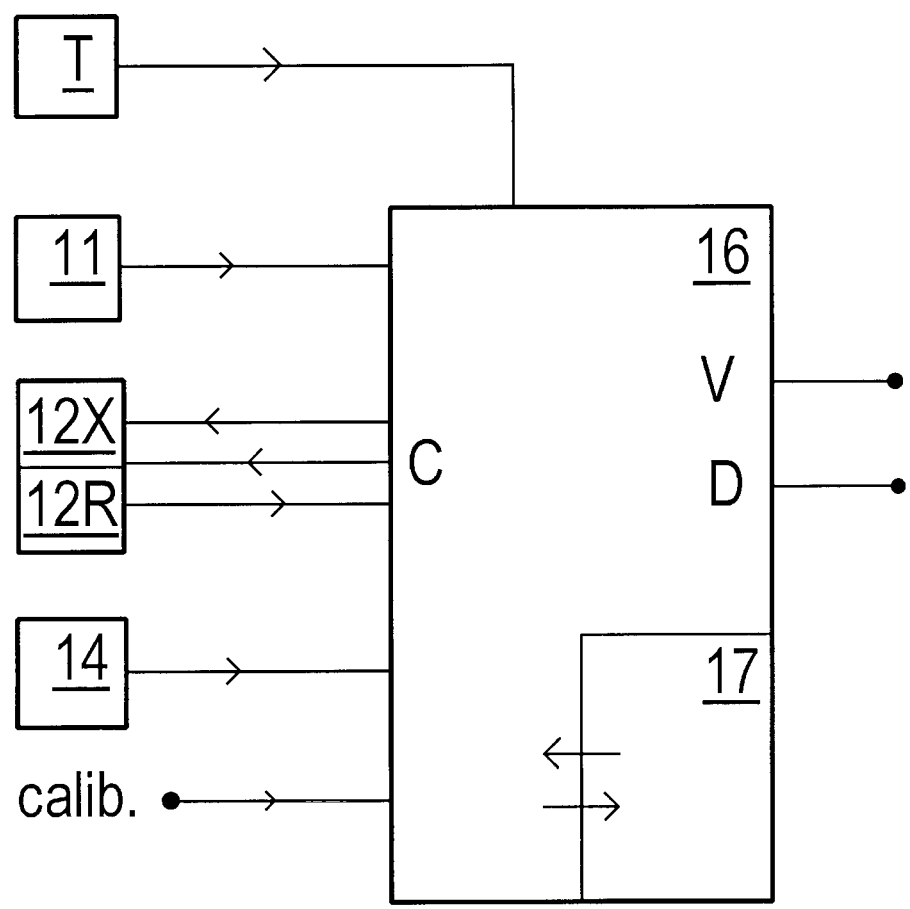
FIG. 3 shows a block diagram of the signal processing that takes place in order to obtain a measure of the position of the stick-bucket joint.

FIG. 3 is a schematic diagram of a processor and controller 16 for the measuring sensors described above. It comprises inputs for receiving inputs from the inclination sensor 11, the ultrasound sensors 12R and 14 and the absolute height sensor T. It comprises an output for the ultrasound transmitter 12X as well as a control output C for this ultrasound element 12 in order to switch it from transmission to reception. Internally, the processor and controller 16 comprises a memory 17 that stores intermediate values for the calculations and tabulated data, such as the data obtained during calibration as described above. Further conversion data, such as trigonometric tables may be factory-installed into the memory along with the dedicated software for the calculations. A control input for putting the processor into calibration mode is also shown.

The output is numerical, referring to a measurement unit (metres or feet and inches) and adapted for visual display V. The primary result of the calculations is the position of the stick-bucket joint 8, however this may be further used in calculating the position of the tip 10 of the bucket. There is also a facility for data output D for use in an automatic controller for an earth moving operation, such as digging or levelling.

There are several places in which the processor and controller may be placed. One advantageous location is in conjunction with the ultrasound transmitter/receiver 12. Another would be in conjunction with the absolute height sensor T that is already provided with calculating power in order to make use of the reference signals that it relies on.

To sum up, in the use of a backhoe digger an indication of the precise depth of the bucket is required. This may be done by measuring the angles and extensions of the elements of the backhoe and calculating the result. This is commonly done by means of angle resolvers and linear encoders. Retro-fitting and calibration of such equipment is very difficult, and according to the invention the same data may be obtained by means of an inclinometer and length measuring devices based on pulsed ultrasound.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

What is claimed is:

1. A measuring apparatus for use with excavating and earth moving equipment, said excavating and earth moving equipment comprising:
    the components:
        a boom;
        a stick;
        a stick extension; and
        a bucket, said components being moveable in relationship to each other and the ground; and
    an ultrasound transmitter and receivers, for measuring the position of the stick-bucket joint with respect to the boom-stick joint, wherein:
        the stick is provided with an ultrasound transmitter;
        a first sensor in the form of an inclination sensor for providing an output signal representing the inclination of the stick with respect to a reference, that the stick extension is provided with a second sensor in the form of an ultrasound receiver providing a signal that is delayed by the instant distance from said ultrasound transmitter; and
        said signals are transmitted to a signal processor provided with a memory for calibration values obtained at any time after installation of said measuring apparatus, said signal processor providing an output representative of the stick-bucket joint position.

2. An apparatus according to claim 1, wherein the stick is furthermore provided with means for correcting for air pressure, air temperature, and air humidity in order to establish the relationship between the distance covered by an ultrasound pulse and the corresponding delay between transmission and reception of said ultrasound pulse under conditions of actual use.

3. An apparatus according to claim 2, wherein the signal from the ultrasound receiver representing the instant distance between the ultrasound transmitter and the ultrasound receiver is corrected by the velocity of sound determined by means of the transmission time of the roundtrip signal from the transmitter via a reflector back to the transmitter in a time window, in which it is acting as a receiver, in order to provide a corrected signal representing the position of the stick-bucket joint with respect to the boom-stick joint.

4. An apparatus according to claim 3, wherein data relating to a reference minimum distance is obtained by obtaining a corrected signal from the ultrasound receiver when the distance between the stick-bucket joint and the boom-stick joint is adjusted to be minimum, the actual distance between the stick-bucket joint and the boom- stick joint being measured and manually entered into the memory.

5. An apparatus according to claim 3, wherein data relating to a reference maximum distance is obtained by obtaining a corrected signal from the ultrasound receiver when the distance between the stick-bucket joint and the boom- stick joint is adjusted to be maximum, the actual distance between the stick-bucket joint and the boom- stick joint being measured and manually entered into the memory.

6. An apparatus according to claim 1, wherein an absolute height sensor is placed on top of the stick, an absolute height signal obtained from said absolute height sensor being used by the signal processor in the determination of the absolute height of the stick-bucket joint.

7. An apparatus according to claim 6, wherein the distance between the stick-bucket joint and the tip of the bucket is regarded as a radius stored in the memory in the calculation in the signal processor for determining the absolute depth of the tip of the bucket.

8. Use of an apparatus according to claim 3, wherein the components of the excavating and earth moving equipment are supplied with the following apparatus components including the required power and signal wiring:
- an inclination sensor is fitted to the stick;
- an ultrasonic transmitter switchable to act as an ultrasonic receiver is fitted to the stick;
- a reflector for ultrasound is fitted to the stick;
- an ultrasonic receiver is fitted to the stick extension;
- a signal processor provided with a memory is fitted to an appropriate part of the excavating and earth moving equipment in accordance with the required power and signal wiring;
- wherein a series of calibrations are performed and entered into the memory comprising the steps of:
  - placing the stick with stick extension vertically and zero-setting the inclination reading of the inclination sensor in the memory;
  - measuring by manual means the minimum stick-bucket joint to boom-stick joint distance and entering it in the memory corresponding to the ultrasonically measured value;
  - measuring by manual means the maximum stick-bucket joint to boom-stick joint distance and entering it in the memory corresponding to the ultrasonically measured value; and
- wherein the operations with the excavating and earth moving equipment are performed while using the signal processor with associated memory to provide corrected data for the position of the bucket tip.

* * * * *